(12) United States Patent  (10) Patent No.: US 7,290,736 B2
Pahl  (45) Date of Patent: Nov. 6, 2007

(54) AIRCRAFT DOOR

(75) Inventor: Guenter Pahl, Hamburg (DE)

(73) Assignee: Airbus Deutschland GmbH (DE)

( * ) Notice: Subject to any disclaimer, the term of this patent is extended or adjusted under 35 U.S.C. 154(b) by 0 days.

(21) Appl. No.: 11/018,640

(22) Filed: Dec. 21, 2004

(65) Prior Publication Data

US 2005/0133667 A1   Jun. 23, 2005

(30) Foreign Application Priority Data

Dec. 22, 2003  (DE)  ................ 103 60 484

(51) Int. Cl.
 *B64C 1/14* (2006.01)
(52) U.S. Cl. .................... 244/129.5; 49/404
(58) Field of Classification Search ............ 244/129.1, 244/129.4, 129.5; 49/404, 409, 410
 See application file for complete search history.

(56) References Cited

U.S. PATENT DOCUMENTS 2,445,131 A   7/1948 Wartian ............... 244/129
5,181,677 A   1/1993 Kaplan et al.
5,259,576 A   11/1993 Howard
5,303,508 A   4/1994 Porte ..................... 49/109
5,673,874 A   10/1997 Howard
6,189,833 B1   2/2001 Ambrose et al. ........ 244/129.5
6,487,819 B1 * 12/2002 Goldberg et al. .......... 49/478.1

FOREIGN PATENT DOCUMENTS

DE   1 218 290   6/1966
GB   624831   6/1949
GB   1 228 969   4/1971

* cited by examiner

*Primary Examiner*—Timothy D. Collins
(74) *Attorney, Agent, or Firm*—Ostrolenk, Faber, Gerb & Soffen, LLP

(57) ABSTRACT

The present invention concerns a sliding door, which, for example, can be guided on three rollers on the door side in rails on the aircraft structure. Locking of such a cargo door occurs by movement of the cargo door parallel to the aircraft X-axis with the locking pins in corresponding sleeves situated on the aircraft structure. In order to guarantee this, the door opening must be larger than the door itself. The gap produced by this is now closed by means of a locking element that clamps the door. This permits a light structure of the cargo door and therefore a weight saving.

6 Claims, 13 Drawing Sheets

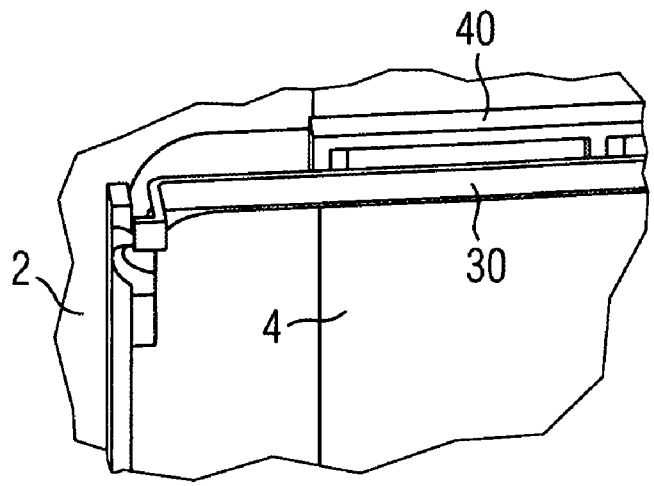 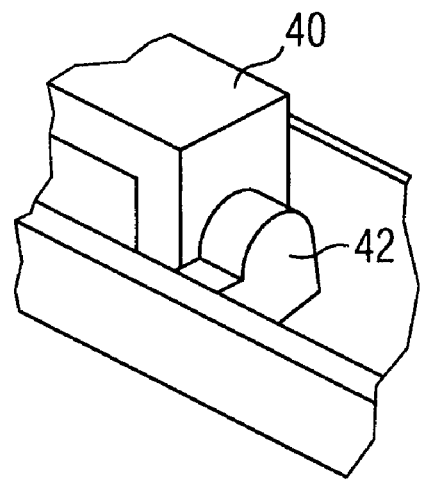
FIG 12aFIG 12b
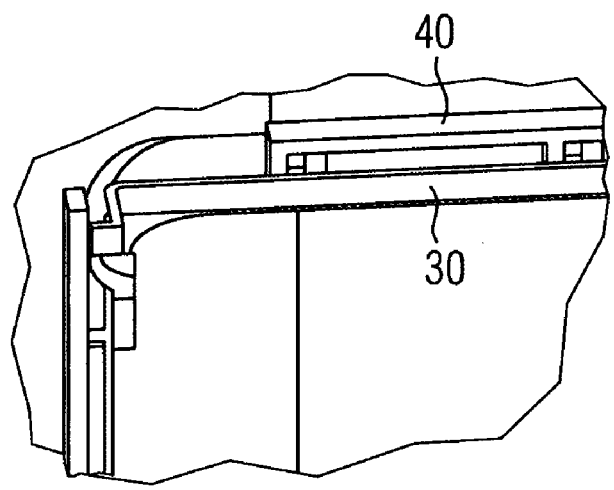 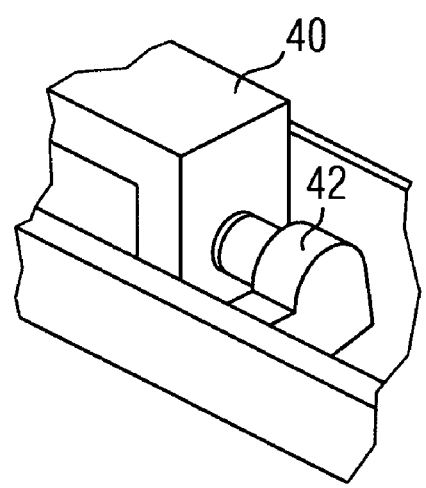
FIG 13aFIG 13b

AIRCRAFT DOOR

FIELD OF THE INVENTION

The present invention relates to an aircraft door and a corresponding method for opening an aircraft door.

BACKGROUND OF THE INVENTION

Conventional aircraft doors, for example, cargo doors, are opened upward by means of hydraulic cylinders via a hinge. Such cargo doors that can be tilted upward must be secured "failsafe" against unwanted falling down. This causes increased structural demands with additional weight. This also requires a very demanding locking mechanism. Such known cargo doors are also very wind-sensitive, so that the cargo door ordinarily can no longer be opened above a wind velocity of 40 knots.

SUMMARY OF THE INVENTION

Thus, there may be a need for an improved aircraft door for closing and opening in a shell of an aircraft.

According to an exemplary embodiment of the present invention an aircraft door is provided for closing and opening in a shell of an aircraft, in which the aircraft door can be moved along an essentially longitudinal direction of the aircraft. This may allow to provide for an aircraft door which, for example, has lower weight in comparison with known cargo doors.

Owing to the fact that the aircraft door is arranged in the open state in the wind shadow of the aircraft fuselage, the aircraft door is exposed to reduced loads. For example, a gust load is reduced. In addition, a load during failure of a hydraulic cylinder that can be provided for opening and closing or locking of the cargo door is reduced. Because of the reduced loads, a structural weight reduction may advantageously be produced, which can amount to a weight reduction of about 430 kg, for example, in a comparison calculation relative to an Airbus A300/600 cargo door. Owing to the fact that the aircraft door executes a movement along essentially the longitudinal direction of the aircraft and no rotational movement, for example, a simple guide and locking mechanism with few moving parts can also be implemented, which may again reduce maintenance requirements and weight of the locking mechanism. The wind sensitivity of the cargo door, relative to known cargo door variants that are tilted upward, is also advantageously reduced.

According to another embodiment of the present invention, the opening in the shell of the aircraft is larger than the aircraft door so that, in the aircraft door arranged in the opening, there is a gap between a first limitation of the aircraft door and a second limitation of the opening.

According to another embodiment of the present invention, this gap is closed by a first locking element in the closed state of the aircraft door. By inserting the first locking element into the gap between the shell and the aircraft door, the aircraft door can be securely locked.

According to another embodiment of the present invention, at least a second locking element is provided, so that the aircraft door is locked with a movement in the opening in the shell of the aircraft. This movement is essentially along the longitudinal direction of the aircraft. For example, a locking pin on the cargo door can be pushed into a corresponding receptacle in the shell of the fuselage of the aircraft. Advantageously, this may permit simple and secure locking. A very simple, robust and low-maintenance locking mechanism may also be made available on this account.

According to another embodiment of the present invention, the aircraft door is mounted on the fuselage or on the shell of the aircraft, so that the aircraft door is arranged for locking first in the opening. The aircraft door is then moved in the opening along the longitudinal direction of the aircraft for locking of the at least one second locking element. When the aircraft door is in the position in which it is locked by at least a second locking element, the gap between the shell of the aircraft and the aircraft door is closed by the first locking element, so that a second locking of the aircraft door is achieved. Particularly secure locking of the aircraft door may advantageously be possible on this account.

According to another embodiment of the present invention, the aircraft door is mounted by means of a guide rail, arranged in the shell of the aircraft, in which the mounting elements that are arranged on the aircraft door engage, so that it can be moved without rotational movement between the closed state and the open state.

As already discussed, this may advantageously permit simple guiding and mounting of the aircraft door.

According to another embodiment of the present invention, the guide rails and the mounting elements cooperate, so that guiding of the aircraft door along the longitudinal direction of the aircraft and relative to gravity is ensured.

According to another embodiment of the present invention, for opening of the aircraft door, the first locking element is first retracted, so that the aircraft door can be moved along the longitudinal direction of the aircraft for unlocking of the at least second locking element. As soon as the aircraft door is free, i.e., the at least second locking element is no longer locked, the aircraft door is then moved out of the opening along a normal to the shell of the aircraft, i.e., to the outside of the fuselage. As soon as the aircraft door is out of the opening, the aircraft door is pushed relative to the opening along the longitudinal direction of the aircraft, so that the opening is exposed. Advantageously, as already mentioned, the aircraft door executes no rotational movement, but is only guided along a linear movement.

Additional advantageous embodiments, especially a corresponding method for opening and closing of an opening in a shell of an aircraft, may be derived from the following description.

Practical examples of the present invention are described below with reference to the accompanying figures.

FIG. 3b shows a three-dimensional side view of the aircraft door of FIG. 3a;

FIG. 12a shows a three-dimensional view of one stage of opening of the aircraft door according to a practical example of the present invention;

FIG. 12b shows a detail of the second locking mechanism in the stage of opening, depicted in FIG. 12a;

FIG. 13a shows a three-dimensional view of an opening of the aircraft door according to a practical example of the present invention, in which the stage of opening corresponds to a later opening point in comparison with the depiction of FIG. 12a;

FIG. 13b shows a three-dimensional view of a second locking element in the opening stage depicted in FIG. 13a;

DETAILED DESCRIPTION OF EXEMPLARY EMBODIMENTS

The present invention is described below by means of a preferred exemplary embodiment of the present invention, namely, a cargo door. However, it is pointed out that the present invention is not restricted to use with a cargo door, but can also concern other hatches, passenger doors or similar aircraft doors.

Figure 1:
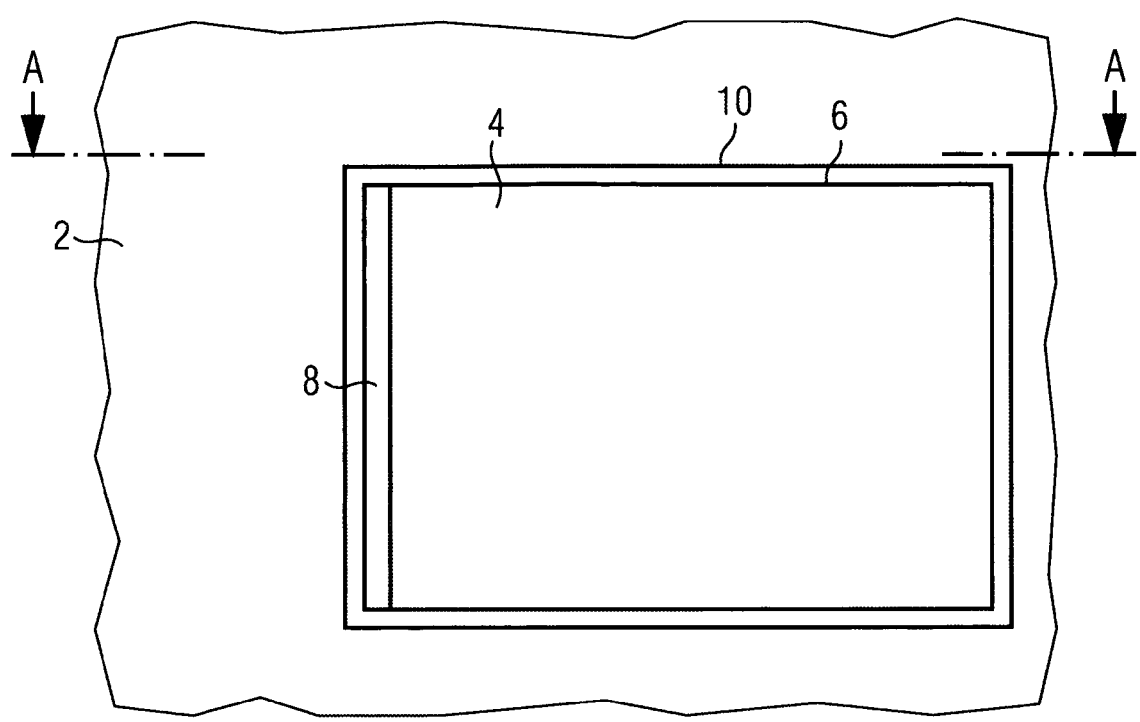
FIG. 1 shows a side view of a practical example of the aircraft door according to the present invention in the closed state.

FIG. 1 shows a side view of a preferred practical example, namely, the cargo door according to the present invention. Reference number 2 in FIG. 1 denotes the shell of the aircraft fuselage. Reference number 4 denotes the cargo door, arranged in opening 6 in shell 2. The cargo door in FIG. 1 is in the closed position. The reference number 8 in FIG. 1 denotes a first locking element, which is also referred to here as closure. Opening 6 in shell 2 is defined by a door frame 10, in which locking sleeves are arranged. Instead of locking sleeves in door frame 10 and the corresponding pins in door 4, it is also possible to configure pins in the frame and sleeves on the door.

As can be deduced from FIG. 1, the cargo door 4 has a smaller size than opening 6. In this respect, the first closure element 8 is provided, which precisely closes the gap between opening 6 and cargo door 4. In other words, the first closure element 8 matches the size of the gap between a cargo door 4 and opening 6. When the cargo door 4, as depicted in FIG. 1, is fully locked, which means it is in the fully closed position, the gap is closed by the first locking element 8, so that the smallest possible intermediate space remains between opening 6, on the one hand, and the first closure element 8 and cargo door 4. Preferably, the door frame 10, the first closure element 8 and the cargo door 4 are fit into the shell 2 of the aircraft fuselage, so that an almost seamless surface is produced. This permits swirling of the air flowing past to be avoided.

A cross section is defined in FIG. 1 with the two arrows, denoted with the letters A. Different opening stages of cargo door 4 along this cross section A-A are depicted in FIG. 2a to 2d.

The same reference numbers are used in the subsequent FIG. 2 to 17 for the same or corresponding elements and assemblies.

FIG. 2a to 2d show different opening stages of cargo door 4 in a cross section along line A-A.

Figure 2A:
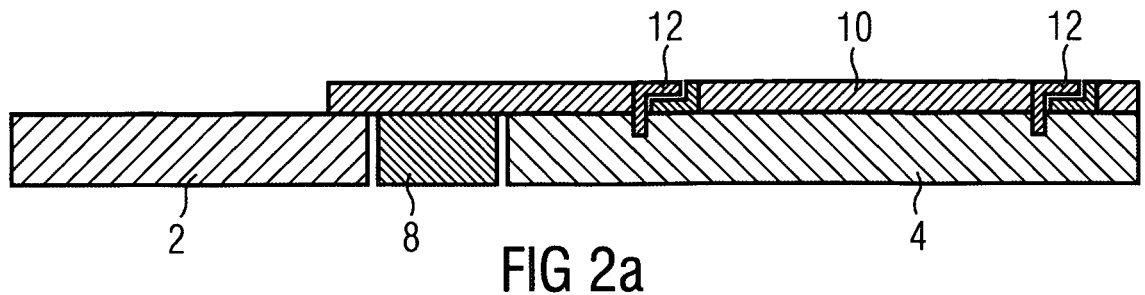
FIGS. 2a to 2d show different stages of opening of the aircraft door in a cross section according to a practical example of the present invention.

FIG. 2a shows the cargo door 4 in the closed state. As can be gathered from FIG. 2a, the gap between shell 2 and cargo door 4 is closed by closure 8. Cargo door 4 is locked on this account. Two second locking elements 12 are also provided in FIG. 21. These second locking elements 12 provide additional locking of cargo door 4. The cargo door 4 is mounted on door frame 10, especially by the second locking elements 12.

FIG. 2a depicts the fully closed, locked state of cargo door 4, for example, during operation of the aircraft, i.e., during flight.

Figure 2B:
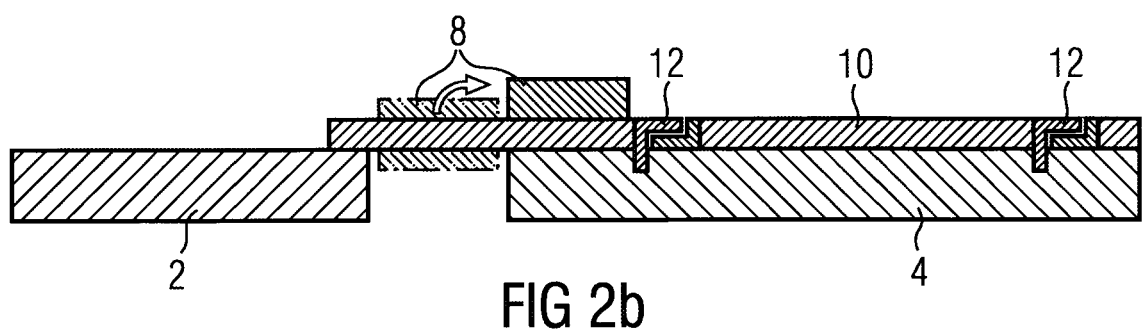

FIG. 2b shows a first opening stage of cargo door 4. For this purpose, as can be gathered from FIG. 2b, the first closure element 8 (closure) moves from the gap to the inside of the aircraft fuselage. For example, the first locking element 8 can be tilted onto the inside of cargo door 4, as shown in FIG. 2b.

Figure 2C:
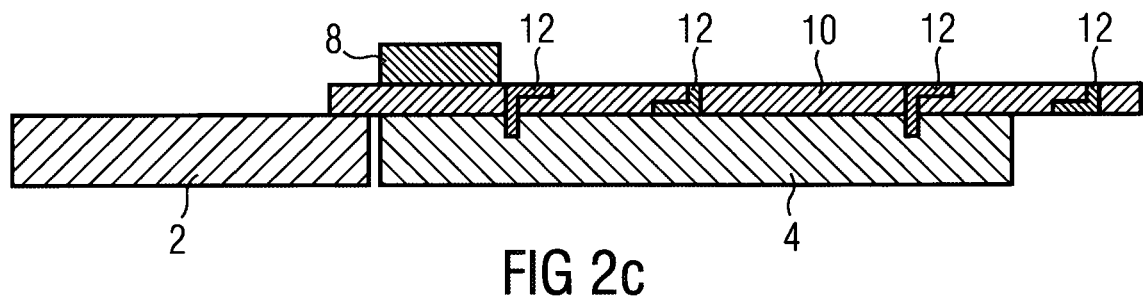

FIG. 2c shows a second opening stage of cargo door 4, which represents a later opening time in comparison with the first opening stage. As can be gathered from FIG. 2c, the cargo door 4 has been moved along the longitudinal direction of the aircraft fuselage (the X-direction of the aircraft fuselage), so that the second locking clamps 12 have been unlocked. For this purpose, the freedom of movement of cargo door 4 in opening 6 is utilized and here through the gap, which is closed in the closed state by means of the first locking element. Accordingly, a gap width of the gap is closed by means of the first locking element 8 in the closed state, adjusted so that sufficient movement freedom for the cargo door 4 is made possible, to the extent that the second locking elements 12 are unlocked.

Figure 2D:
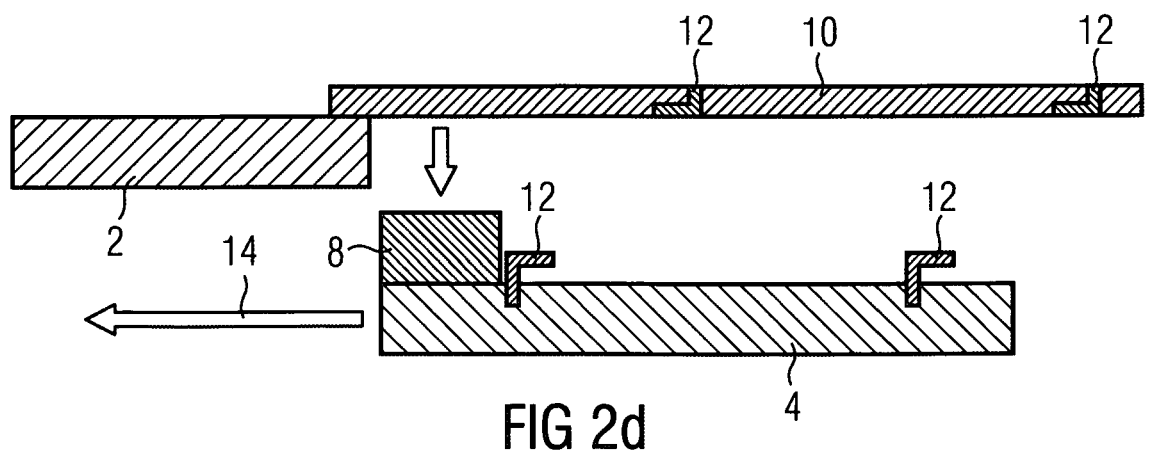

FIG. 2d shows a third opening stage of cargo door 4. As shown with the arrows in FIG. 2d, the cargo door 4 is guided out of the opening to the outside of shell 2. Preferably, this is achieved by means of movement along a normal to the shell 2. The cargo door 4 is then pushed along the longitudinal direction of the aircraft, which is shown here with arrow 14, so that the opening in the aircraft fuselage is exposed As can be gathered from FIGS. 2a to 2d, locking of the cargo door 4 occurs by shifting the cargo door 4 with the second locking elements 12 parallel to the aircraft X-axis (longitudinal axis of the aircraft fuselage). The second locking elements 12 can be locking pins mounted on the cargo door, which engage in corresponding sleeves situated on the aircraft structure. In order to guarantee such locking, as already mentioned, the door opening must be larger than the cargo door 4 itself. The gap resulting from this now, in turn, serves as locking element, in which the first locking element 8 is used to close the gap. The door, which can still have movement freedom along the longitudinal direction of the aircraft after locking with the second locking elements 12, is now firmly clamped in the door opening by the first locking element 8. In order to permit such movement of cargo door 4, the cargo door 4 is preferably configured as a sliding door. Such a sliding door is guided on three rollers on the door side in rails, which can be mounted, for example, on the aircraft structure. These are further described below.

Figure 3A:
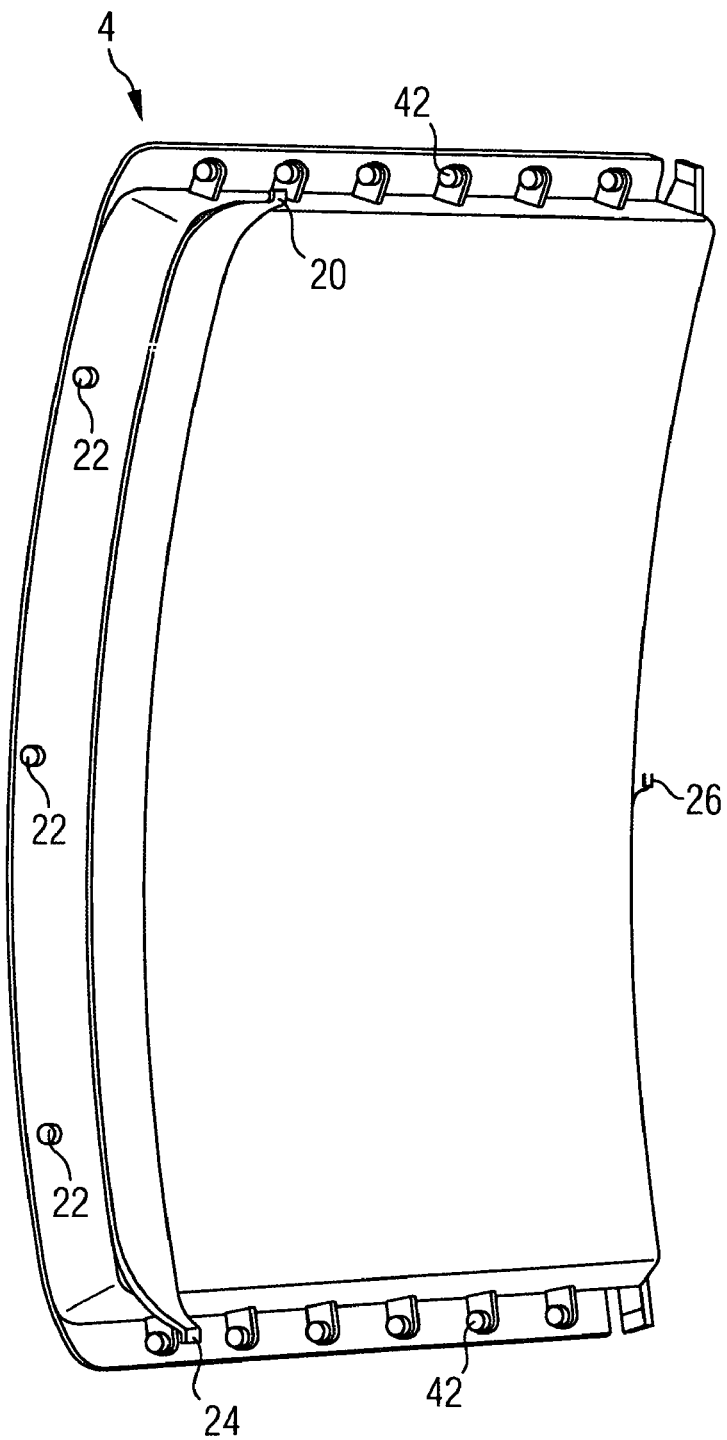
FIG. 3a shows a three-dimensional view of the inside of the aircraft door according to a practical example of the present invention.
Figure 3B:
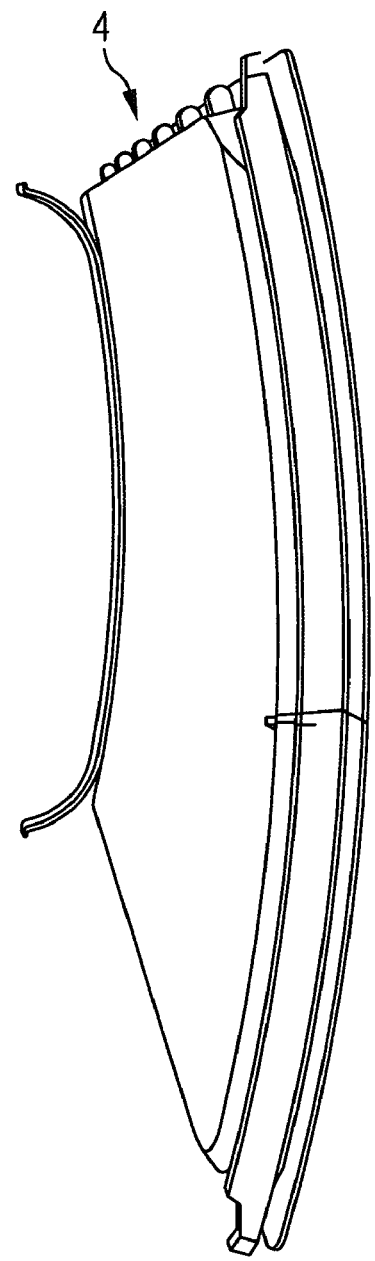

FIG. 3a shows a three-dimensional view of the inside of cargo door 4. FIG. 3b shows a three-dimensional side view of the cargo door of 3a. As can be gathered from FIGS. 3a and 3b, the cargo door 4 is adapted to the camber of the fuselage. The locking elements on the door side, which engage in corresponding locking elements on the fuselage side for formation of the second locking element, are designed here as locking pins. As can be gathered from FIG. 3a, upper locking pins 42 and lower locking pins 42 are provided. Guide rollers are also provided on the top and bottom of the cargo door 4. An upper guide roller 20, in particular, is provided and a lower guide roller 24 is provided, the upper guide roller 20 and the lower guide roller 24 being designed to ride in corresponding guide rails that are mounted on the fuselage (not shown). In addition, the cargo door 4 depicted in FIGS. 3a and 3b has center guide rollers 26, which are formed in a corresponding center guide rail, which is mounted on the upper fuselage. Lateral locking pins 22 can also be provided on the cargo door 4, which snap into or can engage in the corresponding grooves in the door frame 10 in opening 6 or in the first locking element 8.

Figure 4:
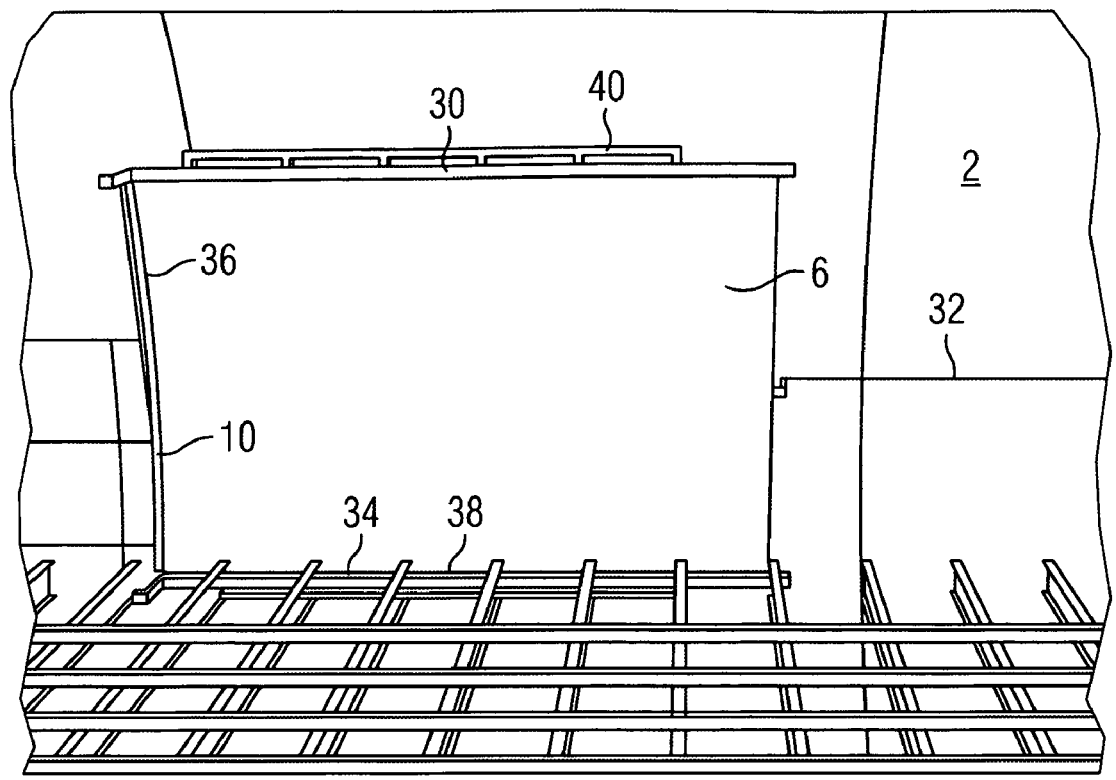
FIG. 4 shows a three-dimensional view of the opening in the shell of the aircraft from the inside of the fuselage.

FIG. 4 shows a three-dimensional view that depicts the opening, viewed from the cargo compartment of the aircraft. The cargo door mounts depicted in FIG. 4 are configured, in particular, to guide or hold a cargo door 4, as shown in FIGS. 3a and 3b. This is described in more detail below.

As can be gathered from FIG. 4, an upper guide rail 30, a center guide rail 32 and a lower guide rail 34 are provided. The upper guide rail 30 and the lower guide rail 34 are arranged roughly along the opening in shell 2 of the aircraft fuselage. The center guide rail 32 is arranged in or on shell 2, so that the cargo door 4 can be secured during opening. In particular, the cargo door is guided by the center guide rail 32 into the open position, in which the cargo door has been pushed rightward to the outside in the perspective depicted in FIG. 4. Practical examples of the center guide rail 32 are described in more detail below with reference to FIGS. 6 to 8.

As can be gathered from FIG. 4, the upper guide rail 30, the center guide rail 32 and the lower guide rail 34 are arranged essentially parallel to each other and essentially parallel to the aircraft longitudinal axis, i.e., the X-axis of the aircraft. Because of this, guiding and movement of the cargo door 4 along the longitudinal axis of the aircraft is made possible.

As can be further gathered from FIG. 4, lateral locking sleeves 36 are provided in the door frame 10 that bounds the opening 6, which cooperate, for example, with the lateral locking pins 22 (FIG. 3a) of cargo door 4. Because of this, seating of the cargo door in the doorframe 10 can be made precise and fixed. In addition, lower locking sleeves 38 and upper locking sleeves 40 are provided in the doorframe, which cooperate with the upper and lower guide pins 42 (FIG. 3a) of the cargo door 4 to form a second locking element 12.

Figure 5:
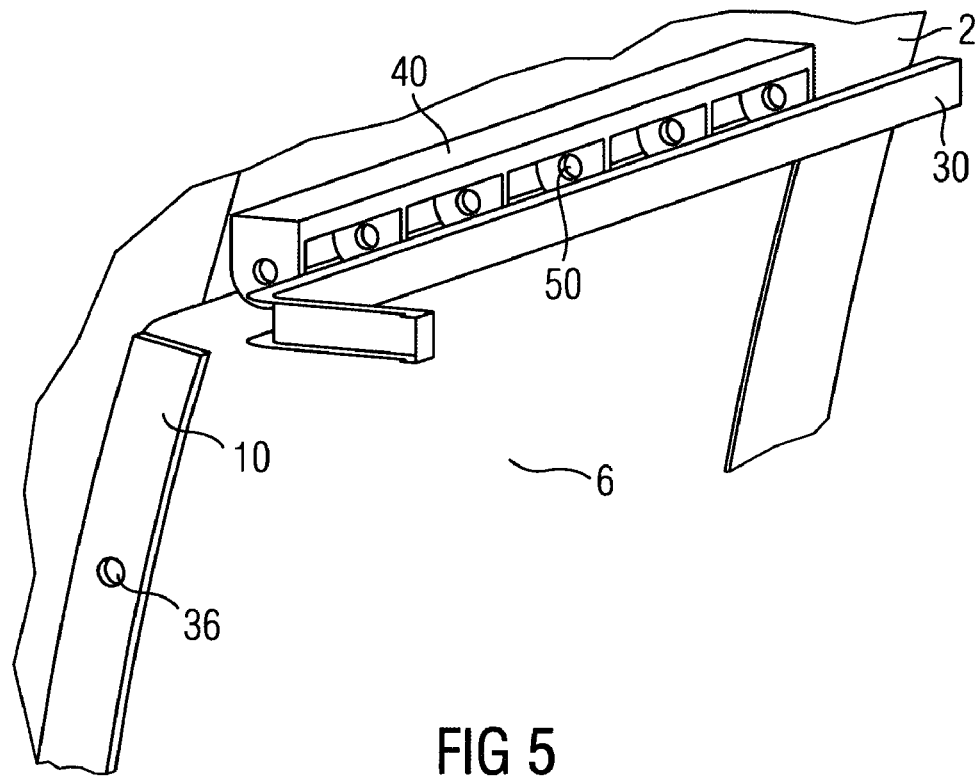
FIG. 5 shows details of the view of FIG. 4.

FIG. 5 shows a three-dimensional view, showing the arrangement and design of the upper locking sleeves 40 and the upper locking rails 30 in greater detail. As can be gathered from FIG. 5, the upper locking sleeves 40 can be configured to engage with holes 50, provided in equidistant vertical struts. The holes 50 are preferably arranged flush, so that the upper locking pins 42 of cargo door 4 (FIG. 3a) can be locked by a movement along the longitudinal direction of the aircraft.

Figure 6:
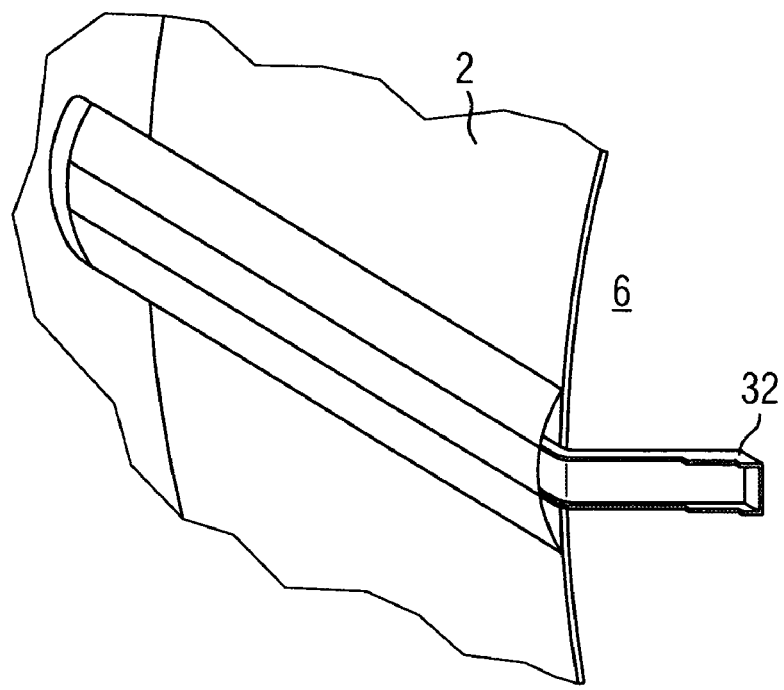
FIG. 6 shows a practical example of a center guide rail for guiding the aircraft door according to a practical example of the present invention.

FIG. 6 shows a three-dimensional view of the outside of shell 2 of the aircraft fuselage with the center guide rails. As can be gathered from FIG. 6, the center guide rail 6 has a region that is bent toward the inside, i.e., the aircraft interior, and extends into opening 6. With this region extending into the aircraft interior, the guide rails 32 engage the center guide rollers 26 (FIG. 3a) of the cargo door 4 when the cargo door is fully locked (which means the first and second locking elements are locked). The cargo door 4 is also engaged with this inward-facing region of the guide rails 32, as long as the cargo door 4 moves in the plane of shell 2. In particular, this is the case when the second locking elements 12 are unlocked. If the cargo door is moved from opening 6 to the outside of the aircraft fuselage, the center guide rollers 26 roll on the center guide rails 32 along the outside of the aircraft fuselage, until the cargo door 4 is in the fully opened position, in which the cargo door opening 6 is essentially exposed.

Figure 7:
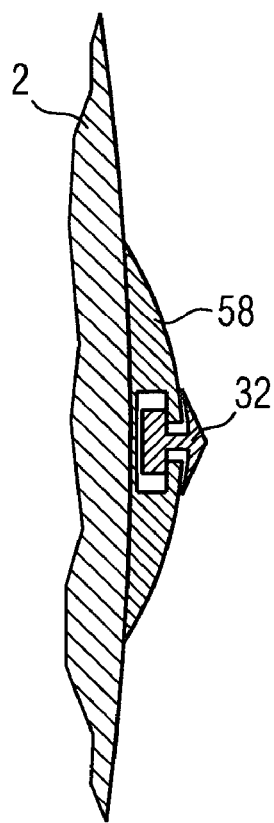
FIG. 7 shows a cross section of the guide rail depicted in FIG. 6.
Figure 8:
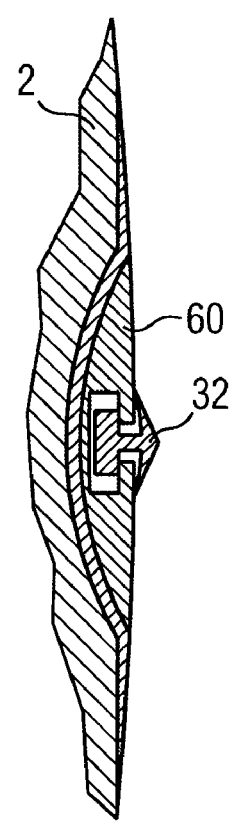
FIG. 8 shows another practical example of a center guide rail in the shell of the aircraft in cross section.

FIGS. 7 and 8 show cross sections of preferred practical examples of the center guide rails 32. As can be gathered from FIG. 7, the guide rail 32 is arranged on the shell 2 by means of a reinforcement element 58. In contrast to this, the guide rail 32 in the practical example of FIG. 8 is embedded in shell 2 by means of another reinforcement element 60. In the practical example of FIG. 8, it can be necessary that structural changes to the shell are required in the region of the center guide rail 32.

Figure 9:
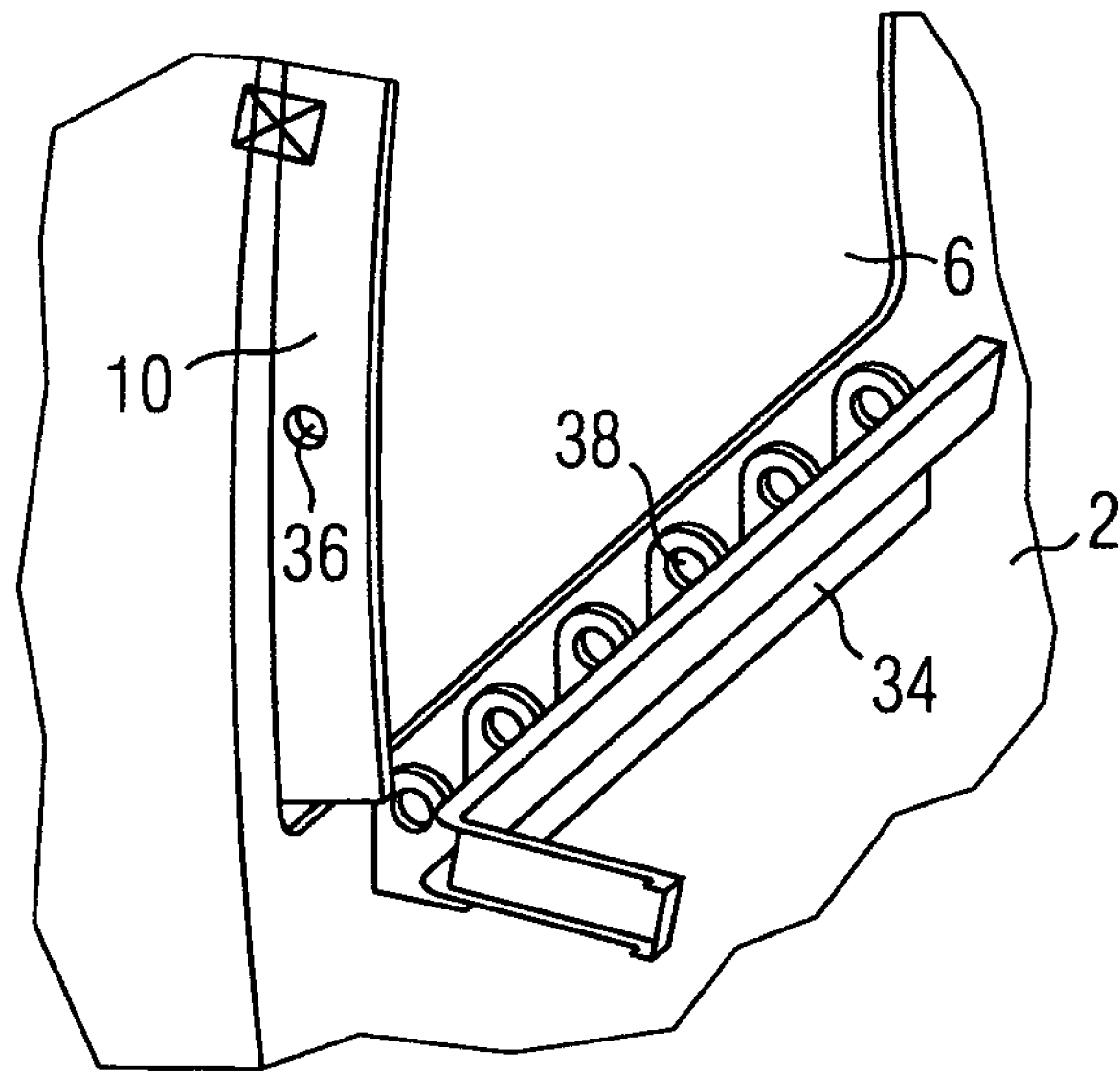
FIG. 9 shows a three-dimensional view of a practical example of a lower guide rail according to the present invention.

FIG. 9 shows a three-dimensional detail of the lower guide rail 34. As can be gathered from FIG. 9, the lower guide rail 34 is provided essentially parallel to the lower edge of opening 6. The lower locking sleeves 38 are essentially functionally equivalent to the upper locking sleeves 40. The lower guide rail 34 and the upper guide rail 30, as well as the center guide rail 32, are preferably arranged, so that they provide parallel guiding of cargo door 4, so that the cargo door is guided linearly.

Figure 10A:
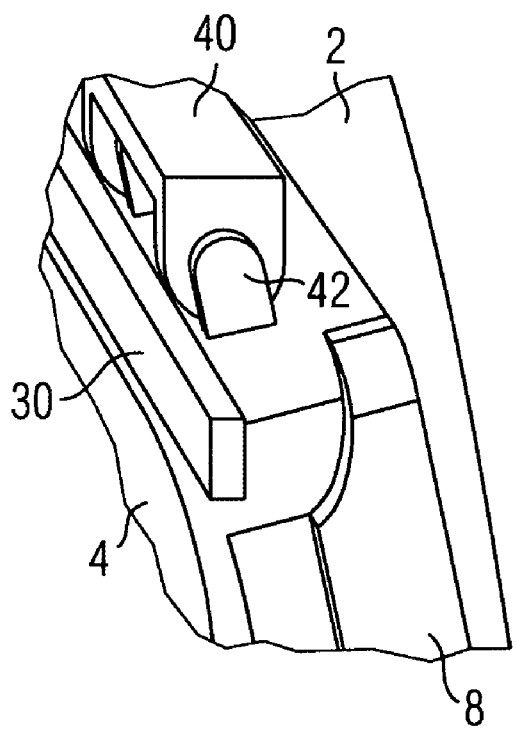
FIGS. 10a to 10d show three-dimensional views of different stages of opening of the aircraft door according to a practical example of the present invention.
Figure 10B:
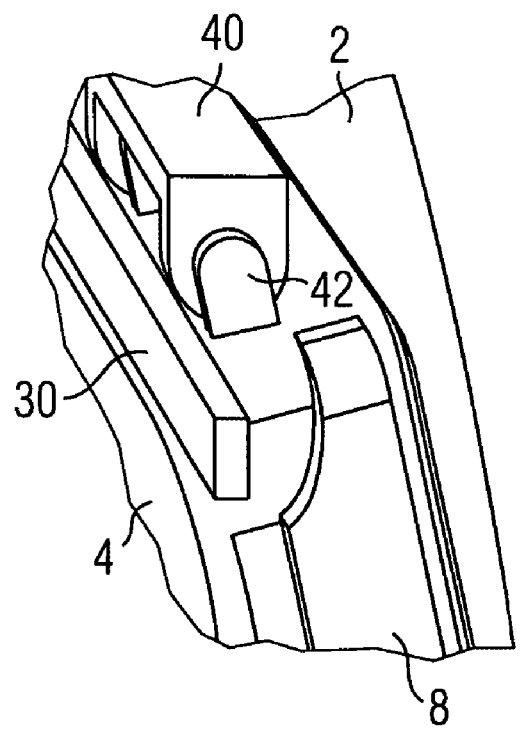
Figure 10C:
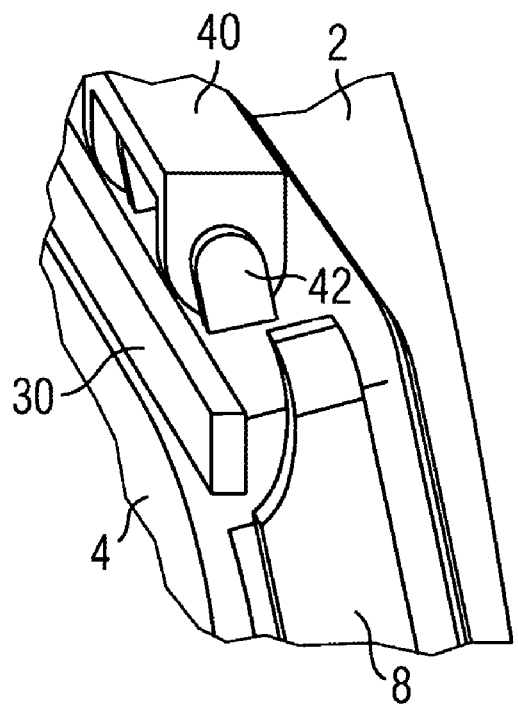
Figure 10D:
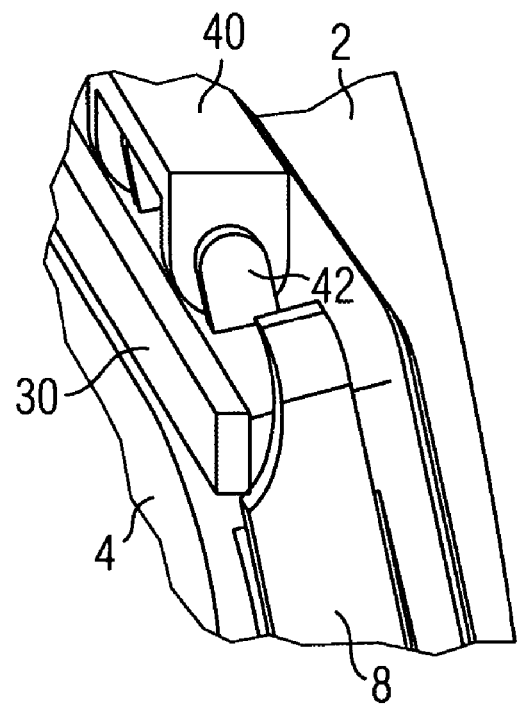

FIGS. 10a to 10d show three-dimensional views of opening stages of cargo door 4 according to a practical example of the present invention. FIG. 10a shows the fully locked state, in which both the first locking element 8 and the second locking element 12 (consisting of pin 42 and upper locking sleeves 40) are locked. In the state depicted in FIG. 10d, the first locking element 8 is completely retracted, so that the cargo door 4 could be moved along the longitudinal axis of the aircraft, in order to unlock the second locking elements. As can be gathered from FIGS. 10a to 10d, the first locking element 8 is pulled from the gap, so that the cargo door 4 has freedom of movement within opening 6, so that it can execute a leftward movement along the longitudinal axis of the aircraft, so that the second locking elements 12 can be unlocked.

Figure 11A:
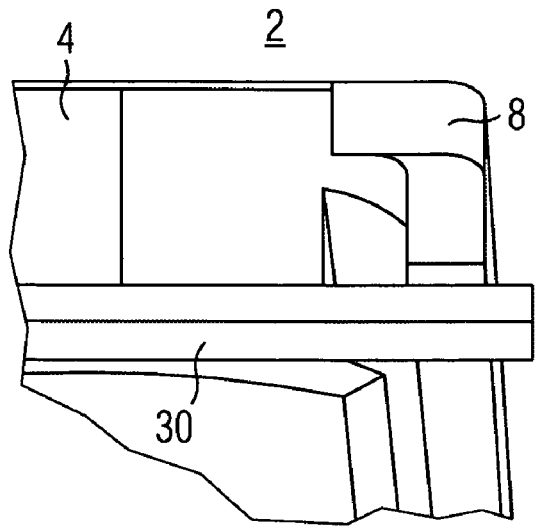
FIGS. 11a to 11d show three-dimensional views of the stages of opening of FIG. 10a to 10d from another perspective.
Figure 11B:
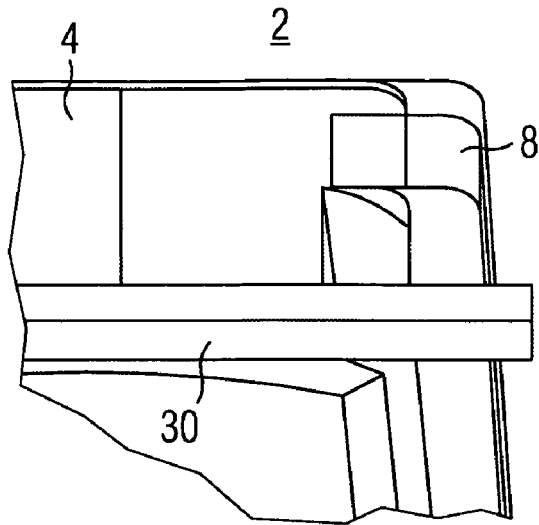
Figure 11C:
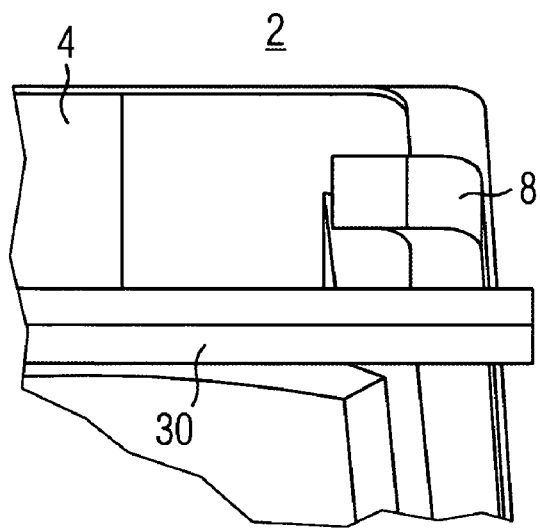
Figure 11D:
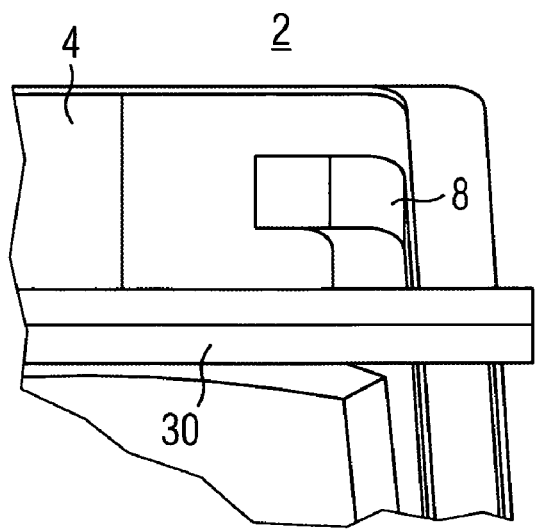

FIGS. 11a to 11d show the unlocking states depicted in FIG. 10a to 10d from a different perspective. As can be gathered from FIGS. 11a to 11d, the first locking element 8 is removed from the gap toward the inside of the aircraft fuselage. The locking element 8, as shown in FIG. 11d, is then moved behind cargo door 4, as could already be deduced from FIG. 2b. In this respect, a separate guiding or holding of the first locking element 8 on the inside of cargo door 4 can be provided.

FIG. 12a shows a three-dimensional view, showing the locked second locking elements. FIG. 12b shows a detail view of FIG. 12a. FIGS. 12a and 12b show a state, in which the second locking elements are locked, i.e., the locking pins 42 are fully inserted into the upper locking sleeves. FIGS. 13a and 13b show the views corresponding to FIGS. 12a and 12b, but the second locking element in FIGS. 13a and 13b is unlocked, i.e., as can be gathered, especially fro FIG. 13b, the upper locking pin 42 is removed from the locking sleeve 40.

Figures 14A, 14B:
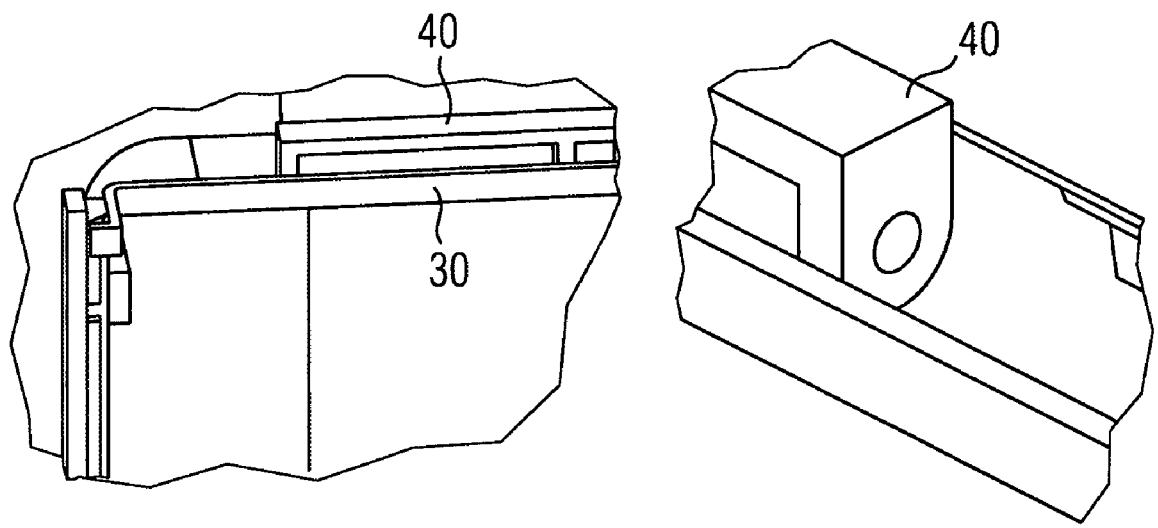
FIGS. 14a to 14c show three-dimensional views of details of a first opening stage.
Figure 14C:
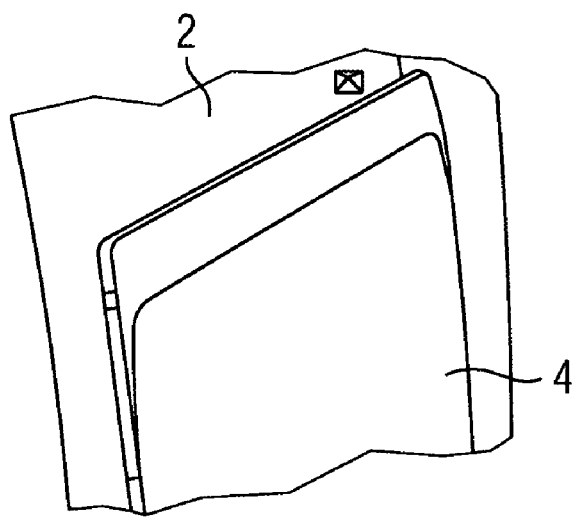

FIGS. 14a to 14c show three-dimensional detail views of the upper guide rails 30 of the upper locking sleeves 40 and the arrangement of the cargo door 4 in shell 2.

Figure 15A:
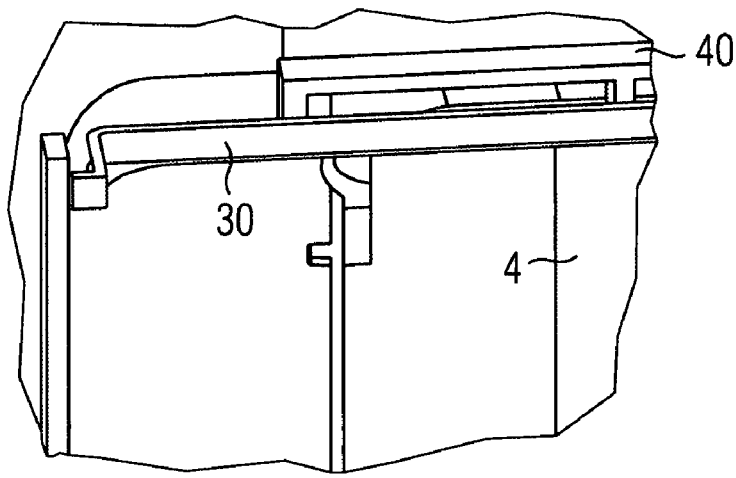
FIGS. 15a to 15c show the details corresponding to FIG. 14a to 14c for a second, later opening stage.
Figure 15B:
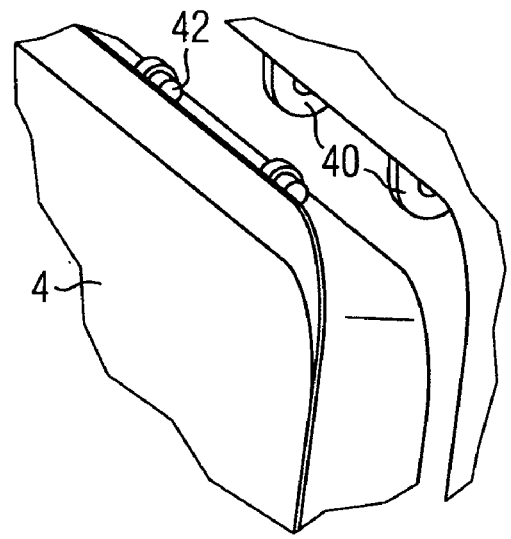
Figure 15C:
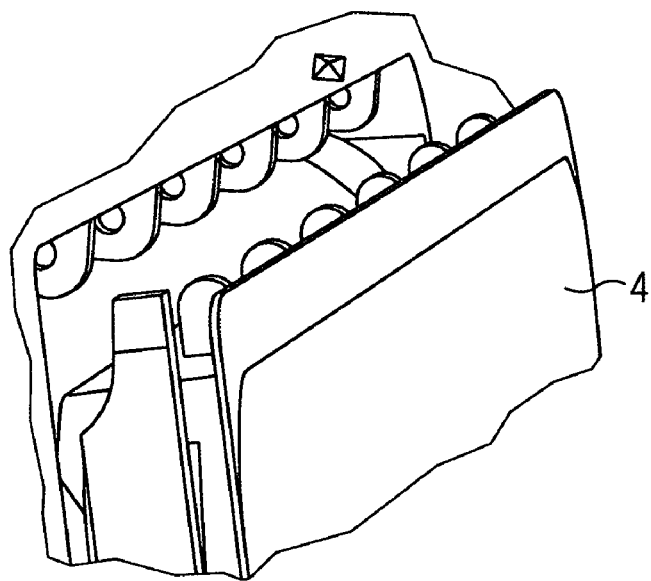

As can be gathered from FIGS. 14a to 14c, the cargo door in these figures is in a state, in which the second locking elements are fully unlocked, and the cargo door can now be moved outward, as shown in the corresponding views of FIGS. 15a to 15c, to then be pushed out laterally along the fuselage.

Figure 16:
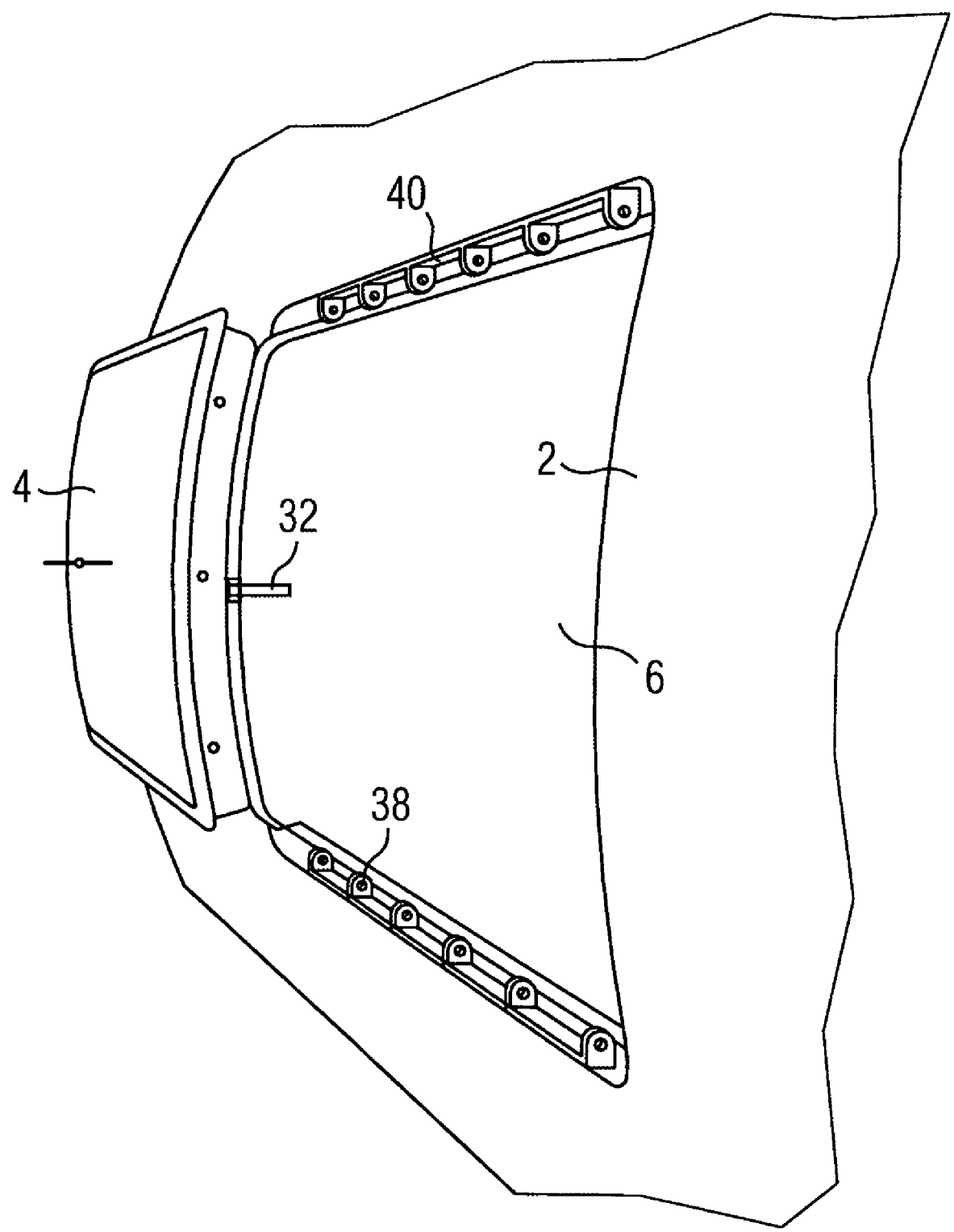
FIG. 16 shows a first three-dimensional view, in which the cargo door is arranged in the opened position.

FIG. 16 shows a three-dimensional view of the outside of the aircraft fuselage with the fully opened cargo door 4. As can be gathered from FIG. 16, the cargo door 4 is preferably movable far enough to the outside of the aircraft fuselage under the guidance of at least the center guide rail 32, that the entire opening 6 in the aircraft fuselage is freely accessible.

Figure 17:
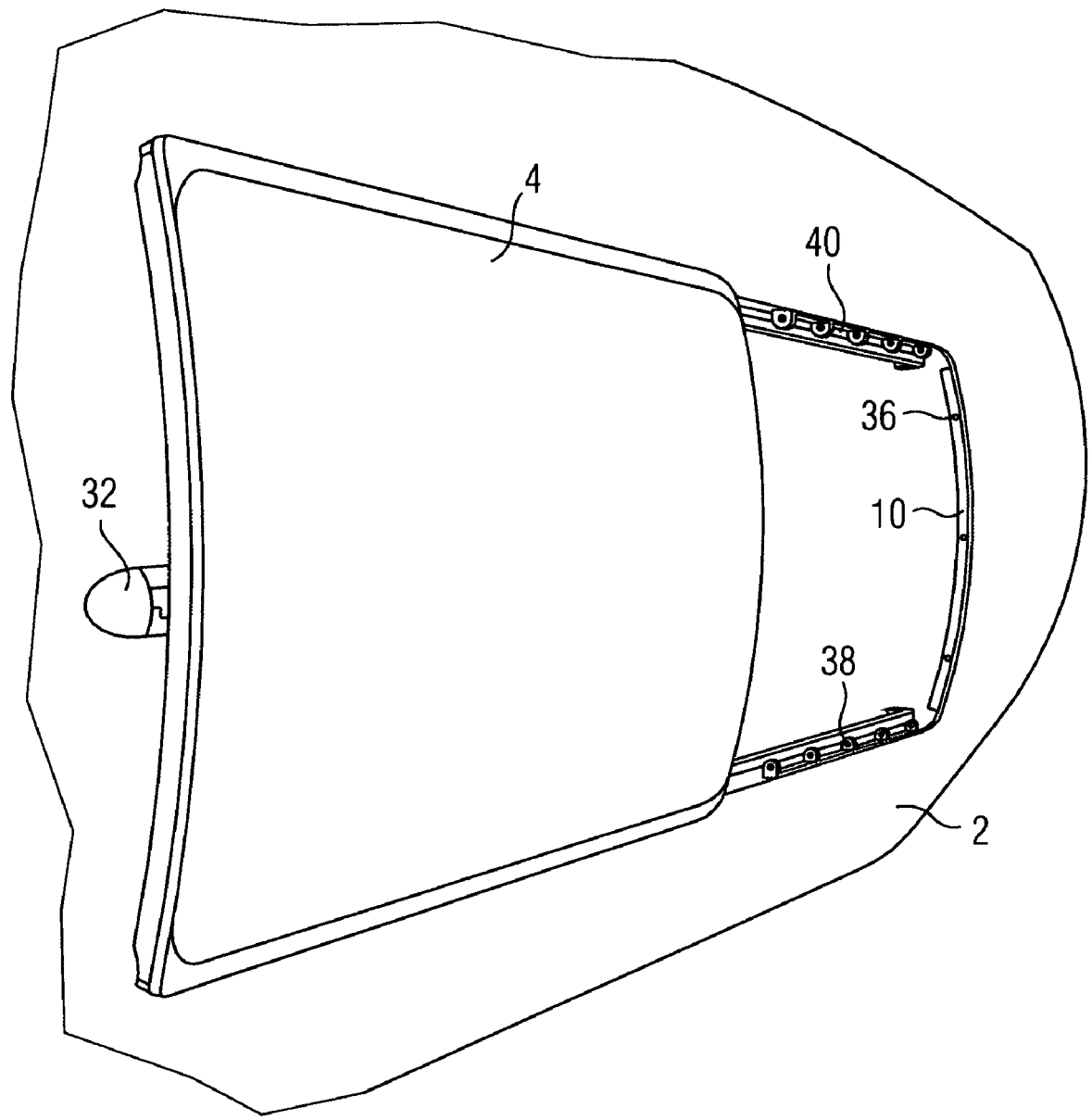
FIG. 17 shows a second three-dimensional view, in which the cargo door is shown in the open position.

FIG. 17 shows another three-dimensional view, showing the opened cargo door 4.

With the aforementioned arrangement of the cargo door 4, as soon as cargo door 4 has been pushed outward from opening 6 in shell 2, it can be pushed collision-free along the outside of the fuselage.

The invention described above preferably permits a simple locking mechanism that gets by with few moving parts. This permits near freedom from maintenance of the cargo door, and also low weight. This also reduces the vulnerability to defects of the locking mechanism. Because of reduced loads from gust loads or failure of a hydraulic cylinder, a structural weight reduction of the cargo door can be achieved that can provide a total weight advantage of about 430 kg, for example, in a comparison calculation relative to the now common Airbus A300/600 cargo door.

What is claimed is:

1. Aircraft door for closure of an opening in a shell of an aircraft,
   wherein the aircraft door is movable along a longitudinal direction of the aircraft, and
   wherein the opening in the shell of the aircraft is larger than the outer surface of the aircraft door, so that a gap is present between an edge of the aircraft door and an edge of the opening when the aircraft door closes the opening,
   a first locking element being provided, the first locking element being arranged in the gap for locking of the aircraft door in the opening, the first locking element closing the gap to form a portion of the shell of the aircraft and translating parallel and perpendicular to the aircraft door when the aircraft door closes the opening.

2. The aircraft door of claim 1,
   wherein at least a second locking element is provided, so that the aircraft door is locked by means of a displacement along the longitudinal direction of the aircraft in the opening.

3. The aircraft door of claim 2,
   wherein, for locking of the aircraft door, the aircraft door is first arrangable in the opening, the aircraft door is then displaceable in the opening along the longitudinal direction of the aircraft for locking of at least the second locking element, and the first locking element is then arrangable in the gap for locking.

4. The aircraft door of claim 1,
   wherein the aircraft door is displaceable between a closed state, in which the aircraft door is fully locked in the opening, and an opened state, in which the aircraft door is movable relative to the opening on an outside of the shell, so that a large region of the opening is not covered by the aircraft door, and
   wherein, for guiding of the aircraft door between the closed state and the open state, holding elements are provided which are adopted for an engagement with an at least one guide rail arranged on the shell.

5. The aircraft door of claim 4,
   wherein the holding elements are operable for cooperation with the at least one guide rail so that guiding of the aircraft door along the longitudinal direction of the aircraft and relative to the force of gravity is ensured.

6. The aircraft door of claim 5,
   wherein the at least one guide rail is operable for guiding of the aircraft door, so that the aircraft door is displaceable from the closed state for unlocking first along the longitudinal axis of the aircraft by a first amount, is movable along a normal to the shell by a second amount for removal of the aircraft door from the opening, and is movable for exposure of the opening along the longitudinal axis of the aircraft by a third amount to the opened state on the outside of the shell; and
   wherein the aircraft door executes no rotational movement.

* * * * *